US010050993B2

(12) United States Patent
Johri et al.

(10) Patent No.: US 10,050,993 B2
(45) Date of Patent: Aug. 14, 2018

(54) NON-INVASIVE WHITELISTING

(71) Applicant: McAfee, LLC, Plano, TX (US)

(72) Inventors: Amritanshu Johri, Haryana (IN); Balbir Singh, Gurgaon (IN); Jaskaran Khurana, New Delhi (IN); Ratnesh Pandey, Uttar Pradesh (IN)

(73) Assignee: McAfee, LLC, Plano, TX (US)

( * ) Notice: Subject to any disclaimer, the term of this patent is extended or adjusted under 35 U.S.C. 154(b) by 0 days.

(21) Appl. No.: 14/495,692

(22) Filed: Sep. 24, 2014

(65) Prior Publication Data

US 2016/0088011 A1    Mar. 24, 2016

(51) Int. Cl.
  *G06F 21/52*    (2013.01)
  *H04L 29/06*    (2006.01)

(52) U.S. Cl.
  CPC .......... *H04L 63/1441* (2013.01); *G06F 21/52* (2013.01); *H04L 63/101* (2013.01)

(58) Field of Classification Search
  None
  See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 7,895,448 B1 * | 2/2011 | Satish | G06F 21/577 713/187 |
| 8,201,255 B1 | 6/2012 | Nachenberg | |
| 9,917,864 B2 * | 3/2018 | Kraemer | H04L 63/20 |
| 2006/0031943 A1 * | 2/2006 | Schultz | G06F 21/51 726/29 |
| 2006/0206937 A1 * | 9/2006 | Repasi | G06F 21/52 726/22 |
| 2006/0288420 A1 * | 12/2006 | Mantripragada | G06F 21/51 726/25 |

(Continued)

FOREIGN PATENT DOCUMENTS

| | | |
|---|---|---|
| RU | 2480937 C2 | 4/2013 |
| WO | 2014099623 A1 | 6/2014 |
| WO | 2016048544 A1 | 3/2016 |

OTHER PUBLICATIONS

International Search Report and Written Opinion in International Application No. PCT/US2015/046826 dated Feb. 19, 2016.

(Continued)

*Primary Examiner* — Minh Dinh
(74) *Attorney, Agent, or Firm* — Patent Capital Group

(57) ABSTRACT

In an example, there is disclosed a security architecture for enhanced, non-invasive whitelisting of executable objects. When an executable object tries to perform an action, a security engine seamlessly intercepts the action and determines whether the action is whitelisted, blacklisted, or graylisted, assigning the action a corresponding security score. Whitelisted actions may be allowed, blacklisted actions may be disallowed, and graylisted actions may require additional verification from a user. Because the score is assigned to the combination of the executable object and the action, false positives may be avoided, such as those that may occur when an executable object is prefetched but has not yet tried to perform any useful work.

23 Claims, 6 Drawing Sheets

(56) References Cited

U.S. PATENT DOCUMENTS

| | | | |
|---|---|---|---|
| 2006/0294581 A1* | 12/2006 | Poon | G06F 21/52 |
| | | | 726/6 |
| 2009/0083852 A1 | 3/2009 | Kuo et al. | |
| 2010/0058473 A1 | 3/2010 | Breitenbacher | |
| 2010/0077445 A1 | 3/2010 | Schneider et al. | |
| 2012/0324568 A1* | 12/2012 | Wyatt | G06F 21/51 |
| | | | 726/13 |
| 2013/0042294 A1 | 2/2013 | Colvin et al. | |
| 2013/0097659 A1 | 4/2013 | Das et al. | |
| 2013/0145150 A1* | 6/2013 | Yach | G06F 21/121 |
| | | | 713/155 |
| 2013/0212680 A1 | 8/2013 | Winn et al. | |

OTHER PUBLICATIONS

International Preliminary Report on Patentability issued in PCT Application No. PCT/US2015/046826 dated Mar. 28, 2017; 9 pages.

* cited by examiner though whitelisting solutions are used for executable objects. As used throughout this Specification, the term "executable objects" can include, by way of non-limiting example, executables, DLLs, shared object libraries, static libraries, ActiveX components, drivers, scripts, installer packages, and documents with embedded active content such as macros.

NON-INVASIVE WHITELISTING

FIELD OF THE DISCLOSURE

This application relates to the field of computer security, and more particularly to non-invasive whitelisting of actions by an executable object.

BACKGROUND

Computer security is an important issue, and its importance increases as interconnectivity between computing devices increases. In one example of a traditional security architecture, an antivirus or antimalware agent periodically scans a computer hard drive to determine whether there are executable objects installed on the machine that match the profiles of one or more malicious objects. A user may also manually install updates for executable objects as they become available, or a security administrator may "push" out updates as they become available.

In this example architecture, executable objects may be controlled by a "whitelist" or "blacklist." Executable objects on a "whitelist" are allowed to run uninhibited, while executable objects on a "blacklist" are completely blocked.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
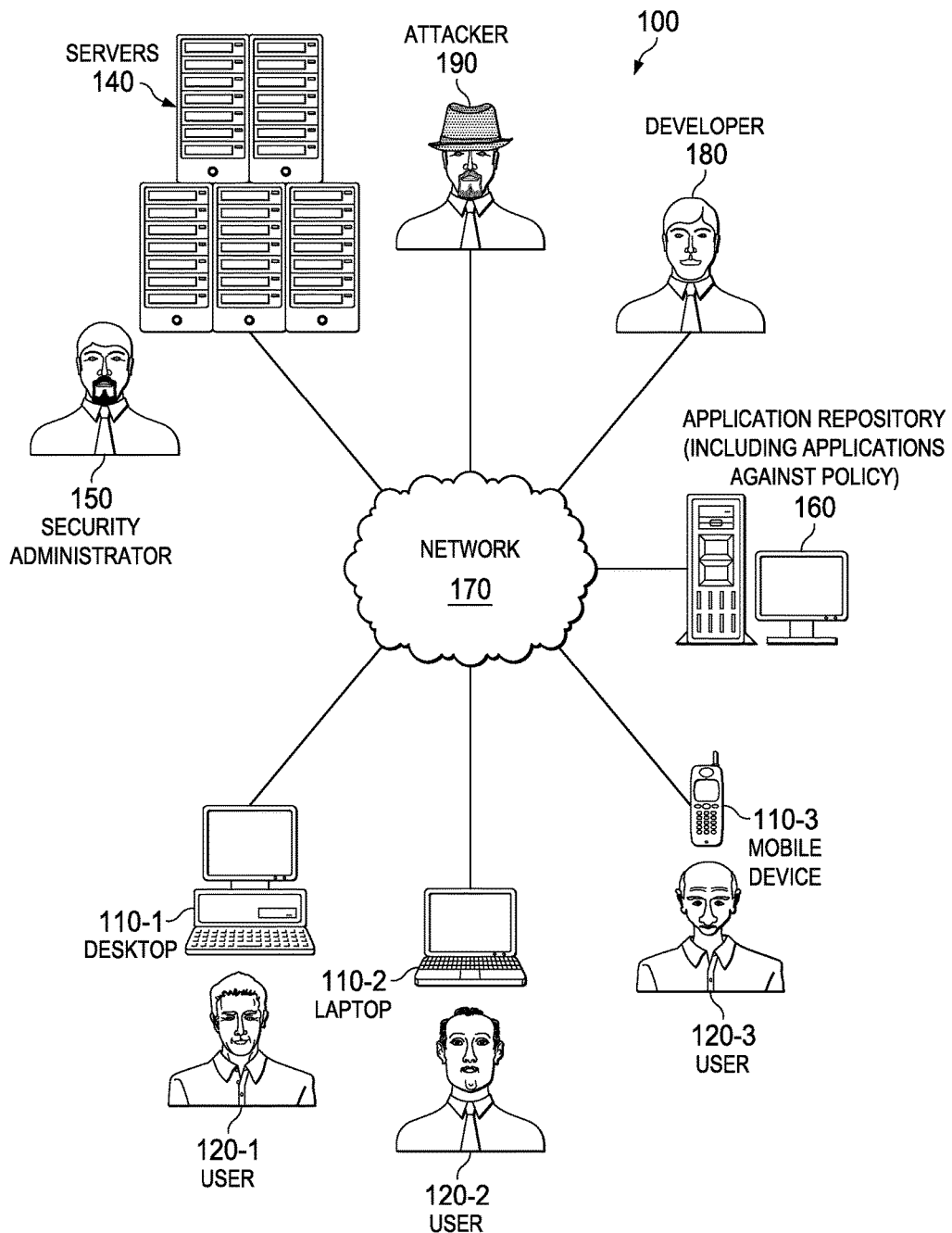
FIG. 1 is a network diagram of a security network according to one or more examples of the present Specification.

In an example, there is disclosed a security architecture for enhanced, non-invasive whitelisting of executable objects. When an executable object tries to perform an action, a security engine seamlessly intercepts the action and determines whether the action is whitelisted, blacklisted, or graylisted, assigning the action a corresponding security score. Whitelisted actions may be allowed, blacklisted actions may be disallowed, and graylisted actions may require additional verification from a user. Because the score is assigned to the combination of the executable object and the action, false positives may be avoided, such as those that may occur when an executable object is prefetched but has not yet tried to perform any useful work.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

A persistent issue in security architectures is the balancing of security with convenience. In most cases, the goals of heightened security and increased convenience are directly in opposition to one another. In other words, generally speaking, that which increases convenience decreases security, while that which increases security decreases convenience. It is therefore desirable to provide a security architecture including nonobvious improvements that to some degree increase both security and convenience.

In one example, whitelisting solutions are used for executable objects. As used throughout this Specification, the term "executable objects" can include, by way of non-limiting example, executables, DLLs, shared object libraries, static libraries, ActiveX components, drivers, scripts, installer packages, and documents with embedded active content such as macros.

Whitelisting by itself is a solution that may be said to increase security at the expense of convenience. In a typical whitelisting solution, a list of allowed or allowable executable objects is maintained by a security subsystem, for example in a database. Any executable object that does not appear on the whitelist is blocked from execution. In the most severe form of a whitelist, the whitelist can only be modified by a user with administrative access, such as a system administrator. Thus, an end-user, such as an individual using a computer, cannot launch any executable objects that the system administrator has not placed on the whitelist.

In a less severe form of whitelisting, the whitelist is still maintained in a manually administered database, but the individual user is given write access to the database, so that he can modify the whitelist at will. In yet another example, a whitelist is maintained, and whenever the user attempts to launch a process from an executable object that does not appear on the whitelist, additional verification (such as in the form of a pop-up dialog or similar) may be required. For example, if the user attempts to launch a process from an external object on the whitelist, a pop-up may appear informing the user that he is about to launch a non-whitelisted executable object, and requesting verification that the user in fact intends to do so. To increase the utility of such a pop-up, software may provide the user with useful information about the executable object. Again, however, there is a trade-off. Providing a large amount of information to the user gives the user additional information on which to base decisions, but risks information overload. In that case, the user sees a large amount of cryptic information that is not meaningful to him, and he therefore ignores the information altogether, making the decision to permit or block the object on a mere guess.

In the system and method of the present Specification, there is disclosed a security architecture that applies computer intelligence to provide increased security while also avoiding inconveniencing the user when not necessary, and avoiding information overload to the user.

In one example of the present Specification, a security architecture is described in which a security engine may be hosted entirely on an end user's computing device, entirely on a server except for a thin client running on the end-user device, or some combination of the two.

To increase utility, a true whitelist may be used in conjunction with both a blacklist and a graylist, and a reputation score may be assigned to both executable objects and to individual actions taken by those objects. In this architecture, objects on a whitelist may always be allowed. Objects on a blacklist may always be blocked, either with or without notification to the end-user or to a server and administrator. Objects on a graylist may receive a graduated score, so that decisions about whether to launch the object, and whether to solicit verification from the end-user or from a server or system administrator, are made based on a plurality of factors. Those factors may include, by way of nonlimiting example, the executable object itself, its contents, a threat intelligence database, previous decisions, previous inputs from the end user or administrator, certificates embedded within the ask executable object itself, or within a catalog, reputation of the executable object, reputation of the creator of the executable object, or other similar factors by way of nonlimiting example. These factors may be used to assign a score, such as a reputation score, to the executable object, so that intelligent decisions can be made about whether to allow the object at all, and whether to require additional user input.

In an embodiment, whitelisting is enhanced by machine learning techniques, which are described in more detail below. As the computing device learns which types of applications a user has allowed before, when the machine encounters a new object, it may examine the object's reputation score. If the reputation score is as good as or higher than the reputation of a plurality of other objects the user has authorized, there may be little value in asking the user for verification again. This machine learning aspect emphasizes that even in "whitelisted" applications, there may be gray areas, which should be handled in an automated fashion whenever it is possible to do so.

In an example method of the present Specification, when an executable object is launched, a security engine determines whether the object itself is whitelisted, blacklisted, or graylisted. If the object is whitelisted, execution may proceed, either with or without notification to the user or administrator. If the executable object is blacklisted, the object is blocked and is not launched, either with or without a notification to the end user, or to a server or administrator.

Any executable object that does not appear either on the whitelist or the blacklist is considered to be a graylisted object. When an object is deemed to be a graylist object, additional machine learning may be deployed to determine whether to allow the object to launch at all, and whether to seek additional verification from a user or administrator.

As mentioned above, a plurality of factors may be employed in assigning the object a confident score. It should be noted that the confidence score need not be a simple monolithic or scalar score. Rather, a confidence score may be a multifaceted score with different factors or scores determining a plurality of possible actions, including by way of nonlimiting example, allowing the application, blocking the application, allowing the application but providing an administrative warning to an administrator, blocking the application and providing an administrative warning to the administrator, allowing the application only if administrative approval is received, allowing the application if approval from the end user is received, such as via a pop-up dialog, blocking the application only if an administrative block is received from an administrator, or blocking the application if an end-user does not verify the action. It should be noted that many other combinations and permutations of inputs and responsive actions may be appropriate in particular contexts. It is therefore anticipated that at design time, a designer practicing the system and method of this Specification will make appropriate design decisions based on prevailing conditions of the time of design, and it is intended any such decisions that fall within the spirit and scope of the appended claims be included therein.

As discussed above, a plurality of factors may be used in the machine learning algorithms of the present Specification. In one example, when an executable object tries to perform an action, that action (in conjunction with the executable object), is assigned a reputation. A "good" or "high" reputation (whitelisted) means that the action is allowed to complete without additional intervention. A "bad" or "low" reputation (blacklisted) means that the action is blocked without additional intervention, but possibly with logging or other notification. A "moderate" or "intermediate" reputation (graylisted) means that some additional feedback or verification may be required before completing the action. This may take the form of user approval, administrative approval, querying a security server or threat intelligence database, heuristic analysis, or similar.

In some cases, the decision concerning a graylisted action is cached, which may be used to inform subsequent instances of the executable object, or a similar executable object, performing the same or a similar action. This may be used to reduce the number of unnecessary solicitations for input, particularly from a user or administrator, which can interrupt workflow. In some cases, an action once authorized by a user is authorized for all subsequent similar actions. A security administrator may also elect to aggregate action authorizations from a plurality of machines, and to selectively craft a security policy therefrom, wherein approved actions may be whitelisted across the enterprise. Thus, in some cases a reputation derived from a single user's interaction on a single machine may be propagated broadly across an entire enterprise.

Previous decisions also interact with reputations as described above. In this case, user decisions may be cached in previous decisions related to a specific executable object may be remembered.

These interactions help to ensure that the security engine rules out many false positives that may occur in response to background machine processes. For example, the machine may prefetch and load an executable object before the user actually requests execution of the object. In that case, a spurious user dialogue may be generated requesting confirmation of the process. Not only is this spurious request unnecessary, but it may be confusing to the end user, as he may not know what process the request applies to. Thus it is desirable to eliminate or limit such spurious verification requests.

FIG. 1 is a network-level diagram of a distributed security network 100 according to one or more examples of the present Specification. In the example of FIG. 1, a plurality of users 120 operate a plurality of computing devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 110-1, which in some cases may also be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

Computing devices 110 may be communicatively coupled to one another and to other network resources via network 170. Network 170 may be any suitable network or combination of networks, including for example, a local area network, a wide area network, a wireless network, a cellular network, or the Internet by way of nonlimiting example. Also connected to network 170 are one or more servers 140, an application repository 160, and human actors connecting through various devices, including for example an attacker 190 and a developer 180. Servers 140 may be configured to provide suitable network services including certain services disclosed in one or more examples of the present Specification.

It may be a goal of users 120 to successfully operate their respective computing devices 110 without interference from attacker 190 and developer 180. In one example, attacker 190 is a malware author whose goal or purpose is to cause malicious harm or mischief. The malicious harm or mischief may take the form of installing root kits or other malware on computing devices 110 to tamper with the system, installing spyware or adware to collect personal and commercial data, defacing websites, operating a botnet, for example for operating a spam server, or simply to annoy and harass users 120. Thus, one aim of attacker 190 may be to install his malware on one or more computing devices 110. As used throughout this Specification, malicious software ("malware") includes any virus, trojan, zombie, rootkit, backdoor, worm, spyware, adware, ransomware, dialer, payload, malicious browser helper object, cookie, logger, or similar designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Servers 140 may be operated by a suitable enterprise to provide security updates and services, including anti-malware services. Servers 140 may also provide substantive services. In one example, servers 140 are configured to distribute and enforce enterprise computing and security policies. These policies may be administered by security administrator 150 according to written enterprise policies. Security administrator 150 may also be responsible for administering and configuring servers 140, and all or a portion of network 170.

Developer 180 may also operate on network 170. Developer 180 may not have malicious intent, but may develop software that poses a security risk. For example, a well-known and often exploited security flaw is the so-called buffer overrun, in which a malicious user such as attacker 190 is able to enter an overlong string into an input form and thus gain the ability to execute arbitrary instructions or operate with elevated privileges on a computing device 110. Buffer overruns may be the result, for example, of poor input validation or incomplete garbage collection, and in many cases arise in nonobvious contexts. Thus, although not malicious himself, developer 180 may provide an attack vector for attacker 190. Applications developed by developer 180 may also cause inherent problems, such as crashes, data loss, or other undesirable behavior. Developer 180 may host software himself, or may upload his software to an application repository 160. Because software from developer 180 may be desirable itself, it may be beneficial for developer 180 to occasionally provide updates or patches that repair vulnerabilities as they become known.

Application repository 160 may represent an "app store," Unix-like repository, or other network service providing users 120 the ability to interactively or automatically download and install applications on computing devices 110. Developer 180 and attacker 190 may both provide software via application repository 160. If application repository 160 has security measures in place that make it difficult for attacker 190 to distribute overtly malicious software, attacker 190 may instead stealthily insert vulnerabilities into apparently-beneficial applications.

In some cases, one or more users 120 may belong to an enterprise. The enterprise may provide policy directives that restrict the types of applications that can be installed, for example from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with enterprise policies.

In another example, user 120 may have be a parent of young children, and wish to protect the young children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

Thus, it is a goal of users 120 and security administrator 150 to configure and operate computing devices 110 while limiting or eliminating potentially unwanted content (PUC), including all of the species of PUC described above. Computing devices 110 may include services for identifying and eliminating PUC, and servers 140 may provide additional network-based services that are configured to enforce policies, and otherwise assist computing devices 110 in excluding PUC.

Figure 2:
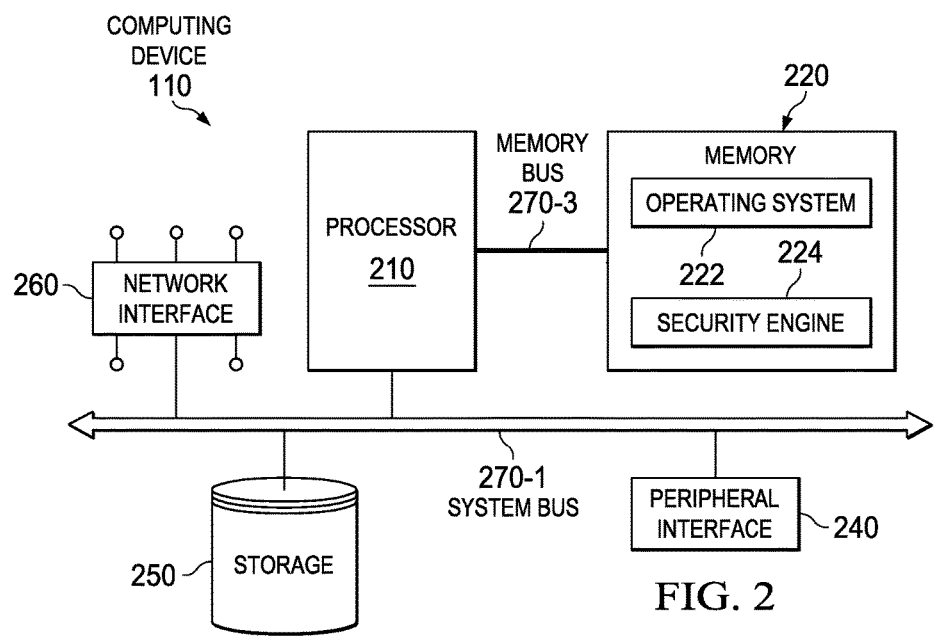
FIG. 2 is a block diagram of a computing device according to one or more examples of the present Specification.

FIG. 2 is a block diagram of client device 110 according to one or more examples of the present Specification. Client device 110 may be any suitable computing device. In various embodiments, a "computing device" may be or comprise, by way of non-limiting example, a computer, embedded computer, embedded controller, embedded sensor, personal digital assistant (PDA), laptop computer, cellular telephone, IP telephone, smart phone, tablet computer, convertible tablet computer, handheld calculator, or any other electronic, microelectronic, or microelectromechanical device for processing and communicating data Client device 110 includes a processor 210 connected to a memory 220, having stored therein executable instructions for providing an operating system 222 and security engine 224. Other components of client device 110 include a storage 250, network interface 260, and peripheral interface 240.

In an example, processor 210 is communicatively coupled to memory 220 via memory bus 270-3, which may be for example a direct memory access (DMA) bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of hardware, software, or firmware providing programmable logic, including by way of non-limiting example a microprocessor, digital signal processor, field-programmable gate array, programmable logic array, application-specific integrated circuit, or virtual machine processor.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device, such as a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of security engine 224. Many other configurations are also possible, and are intended to be encompassed within the broad scope of this Specification.

Network interface 260 may be provided to communicatively couple client device 110 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Figure 4:
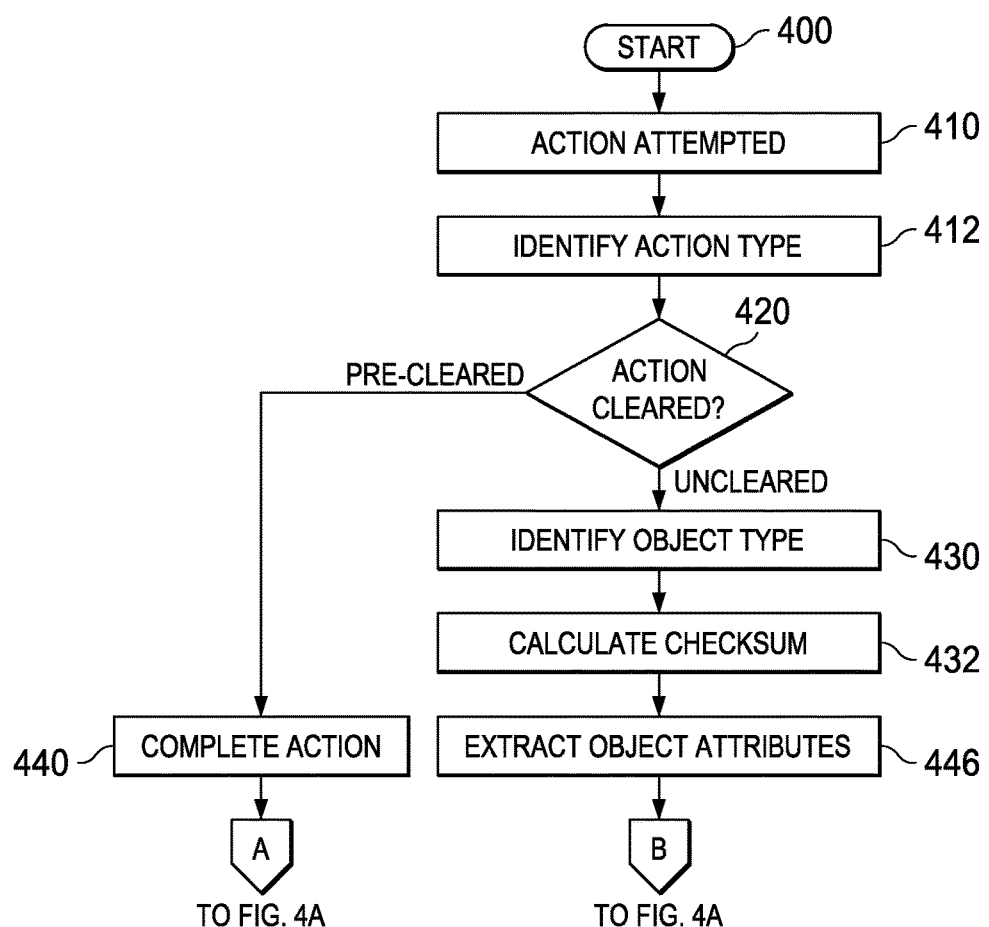
FIGS. 4 and 4A are a flow chart of a method according to one or more examples of the present Specification.

Security engine 224, in one example, is a utility or program that carries out a method, such as method 400 of FIG. 4, or other methods according to this Specification. Security engine 224 may be, in various embodiments, embodied in hardware, software, firmware, or some combination thereof. For example, in some cases, security engine 224 may include a special integrated circuit designed to carry out a method or a part thereof, and may also include software instructions operable to instruct a processor to perform the method. In some cases, security engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. It should also be noted that security engine 224 is provided by way of non-limiting example only, and that other hardware and software, including interactive or user-mode software, may also be provided in conjunction with, in addition to, or instead of security engine 224 to perform methods according to this Specification.

In one example, security engine 224 includes executable instructions stored on a non-transitory medium operable to perform method 400 of FIG. 4, or a similar method according to this Specification. At an appropriate time, such as upon booting client device 110 or upon a command from operating system 222 or a user 120, processor 210 may retrieve a copy of security engine 224 (or software portions thereof) from storage 250 and load it into memory 220. Processor 210 may then iteratively execute the instructions of security engine 224.

Peripheral interface 240 may be configured to interface with any auxiliary device that connects to client device 110 but that is not necessarily a part of the core architecture of client device 110. A peripheral may be operable to provide extended functionality to client device 110, and may or may not be wholly dependent on client device 110. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 3:
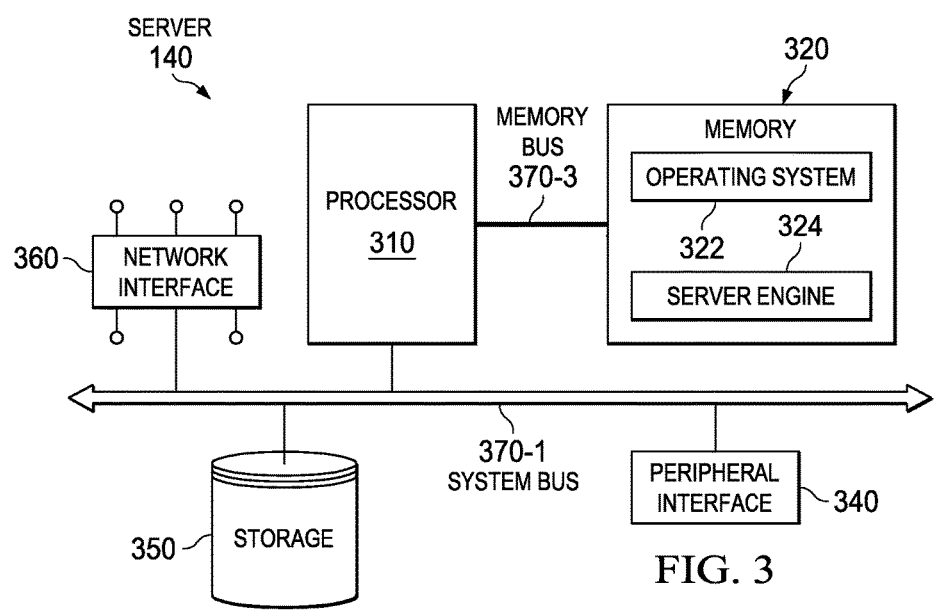
FIG. 3 is a block diagram of a server computer according to one or more examples of the present Specification.

FIG. 3 is a block diagram of server 140 according to one or more examples of the present Specification. Server 140 may be any suitable computing device, as described in connection with FIG. 2. In general, the definitions and examples of FIG. 2 may be considered as equally applicable to FIG. 3, unless specifically stated otherwise.

Server 140 includes a processor 310 connected to a memory 320, having stored therein executable instructions for providing an operating system 322 and server engine 324. Other components of server 140 include a storage 350, network interface 360, and peripheral interface 340.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3. To simplify this disclosure, memory 320 is disclosed as a single logical block, but in a physical embodiment may include one or more blocks of any suitable volatile or non-volatile memory technology or technologies, as described in connection with memory 220 of FIG. 2. In certain embodiments, memory 320 may comprise a relatively low-latency volatile main memory, while storage 350 may comprise a relatively higher-latency non-volatile memory. However, memory 320 and storage 350 need not be physically separate devices, as further described in connection with FIG. 2

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324. Many other configurations are also possible, and are intended to be encompassed within the broad scope of this Specification.

Network interface 360 may be provided to communicatively couple server 140 to a wired or wireless network.

Server engine 324, in one example, is a utility or program that carries out methods according to this Specification. Server engine 324 may be, in various embodiments, embodied in hardware, software, firmware, or some combination thereof. For example, in some cases, server engine 324 may include a special integrated circuit designed to carry out a method or a part thereof, and may also include software instructions operable to instruct a processor to perform the method. In some cases, server engine 324 may run as a daemon process, as described above. It should also be noted that server engine 324 is provided by way of non-limiting example only, and that other hardware and software, including interactive or user-mode software, may also be provided in conjunction with, in addition to, or instead of server engine 324 to perform methods according to this Specification.

In one example, server engine 324 includes executable instructions stored on a non-transitory medium operable to perform methods according to this Specification. At an appropriate time, such as upon booting server 140 or upon a command from operating system 322 or a user 120, processor 310 may retrieve a copy of server engine 324 (or software portions thereof) from storage 350 and load it into memory 320. Processor 310 may then iteratively execute the instructions of server engine 324.

Peripheral interface 340 may be configured to interface with any auxiliary device that connects to server 140 but that is not necessarily a part of the core architecture of server 140. A peripheral may be operable to provide extended functionality to server 140, and may or may not be wholly dependent on server 140. In some cases, a peripheral may be a computing device in its own right. Peripherals may include, by way of non-limiting examples, any of the devices discussed in connection with peripheral interface 240 of FIG. 2.

Figure 4A:
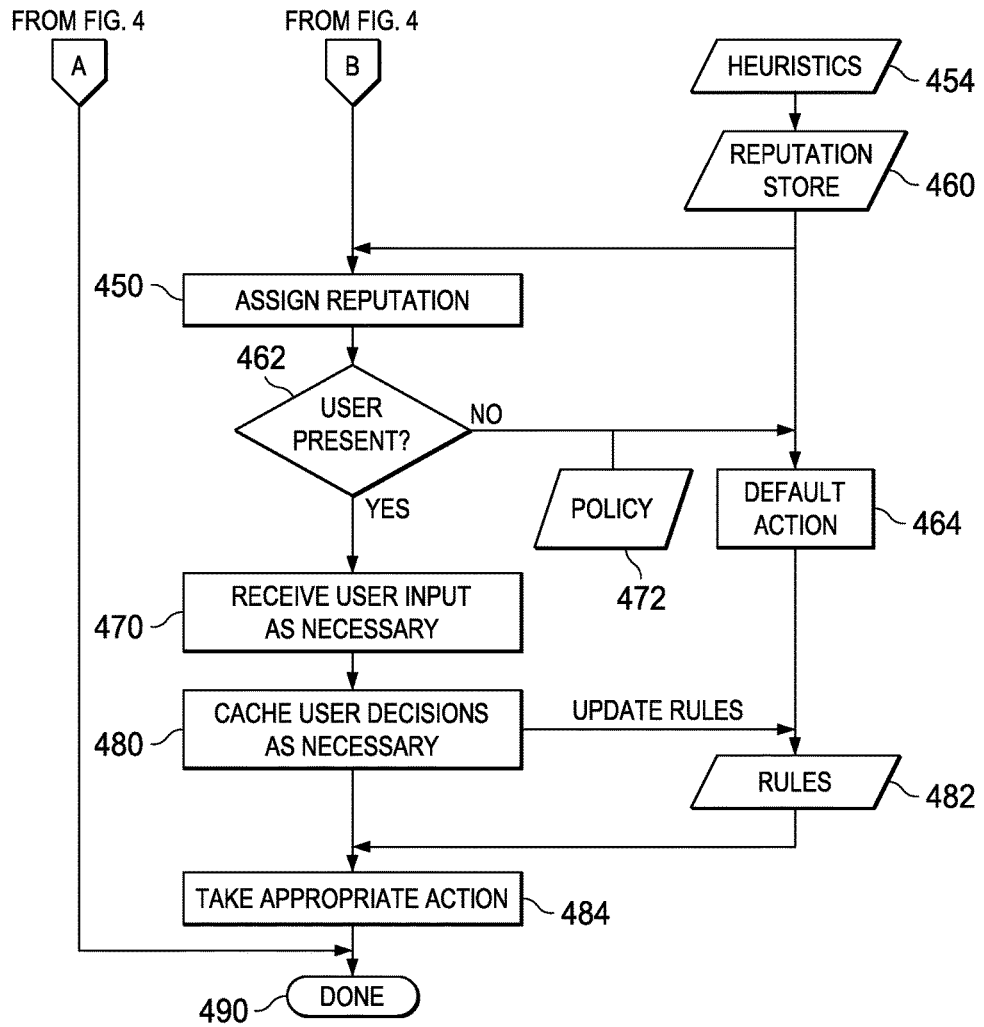

FIGS. 4 and 4A are a flow chart of a method 400 performed by security engine 224 according to one or more examples of the present Specification. It should be noted that the operations disclosed in connection with FIG. 4 and discussed in connection with security engine 224 are provided by way of example only. In certain embodiments, some or all of the actions disclosed in connection with FIG. 4 may be performed by server 324 of server 140.

It should also be noted that the order of operations disclosed herein are provided by way of example only, and that each of the operations disclosed herein may not be necessary in certain embodiments of the present Specification. In other cases, other operations may be interposed between the operations disclosed herein, or operations may be performed in a different order where appropriate and logical to do so.

In block 410, an executable object attempts to perform an action, such as when launched by a user 120, prefetched, preloaded, or otherwise loaded into memory. Notably, user 120 executing the object need not be the only operation that initiates block 410, and when launched, the object itself may attempt to perform several different actions.

Advantageously, in method 400, security engine 224 may analyze the object on a per-action basis. Thus, for a particular executable object, some actions may be whitelisted, other actions may be blacklisted, and still other actions may be graylisted. In one example, an executable object is prefetched and loaded in the background, and launched, but has not yet attempted to read from or write to the disk, such as storage 250 or storage 350. In that case, the executable object may be whitelisted for prefetching and background loading, even if it is not whitelisted for disk operations.

In block 412, security engine 224 determines the type of action that is being attempted. The type of action may include an action initiated by user 120, such as copying, editing, adding, deleting, or launching the executable object. The action may also be an action taken by the executable object itself, such as read from disk, write to disk, access certain sectors of the disk or protected memory areas, launch with elevated privileges, load in the background, or any other suitable action.

Decision block 420 determines whether the action is pre-cleared, or in other words, whitelisted.

In block 440, if the action is whitelisted, computing device 110 may complete the action, and in block 490 of FIG. 4A, the method is done.

The foregoing path represents a case where the action is completely pre-cleared, which may be based on machine learning that has determined that this action should be authorized in all cases, or in certain conditions matching the current context of use, and therefore there is no need for additional processing or verification.

Returning to block 420, if the action is uncleared, then additional processing is required.

In block 430, security engine 224 may identify the object's type. For example, security engine 224 may determine whether the executable object is an application, DLL, shared object library, or any of the other types of executable objects discussed herein.

In block 432, security engine 224 calculates a checksum for the object, to use for example as a virtual fingerprint of the object. In some cases, the checksum may have prepended or appended to it information about the object type, and about the action attempted.

In block 446, security engine 224 extracts attributes from the object. These may include, for example, a timestamp, date stamp, author, whether the object is new to computing device 110 or to an enterprise network, and any other suitable attributes.

Proceeding to FIG. 4A, in block 450, security engine 224 calculates and assigns to the executable object and/or action a reputation. This reputation may be based at least in part on a reputation store 460, informed by a heuristic database and/or algorithm 454.

Depending on the reputation of the object, user input may be necessary. It should be noted that user input will not be necessary in all cases. Thus, in decision block 462, security engine 224 determines whether a user 120 is present.

In block 464, if the user is not present, then a default action may be applied. This may include, by way of non-limiting example, allowing the action, blocking the action, updating a whitelist or blacklist, providing a warning or notification to user 120, or providing a warning or notification to security administrator 150. Default action 464 may be informed by both reputation store 460, and by a policy 472, such as an enterprise policy, family policy, or other entity policy. Default action 464 may also be used to update rules 482.

Returning to block 462, if the user is present, then in block 470, computing device 110 solicits and receives user input as necessary.

In block 480, security engine 224 caches the user decision as necessary. The cached user decision may be used to update rules 482.

In block 484, security engine 224 instructs computing device 110 to take an appropriate action, as discussed herein. The appropriate action may be informed by rules 482.

In block 490, the method is done.

Figure 5:
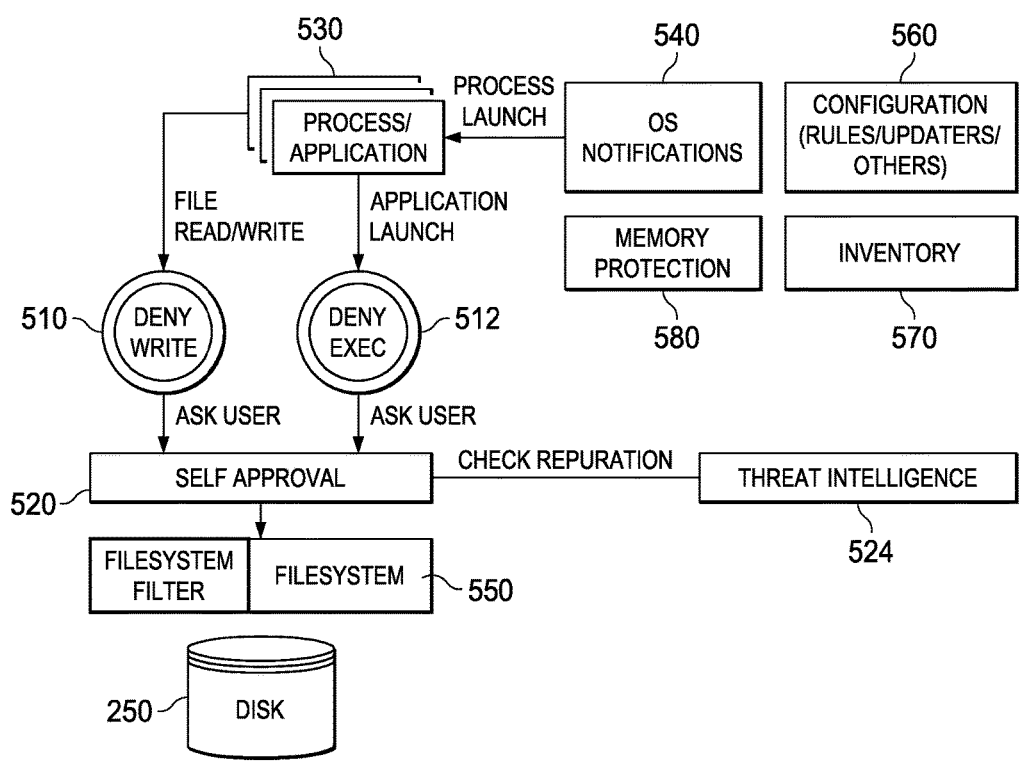
FIG. 5 is a functional block diagram of a security engine according to one or more examples of the present Specification.

FIG. 5 is a functional block diagram of selected components of a security engine 224 according to one or more examples of the present Specification. This configuration is provided by way of example only to illustrate how different pieces of a security engine 224 may interact with one another. In some embodiments, other components may be provided, while in other embodiments, some of the components described in FIG. 5 may not be considered to be part of security engine 224, but rather may be considered external components that interface with security engine 224. In appropriate circumstances, security engine 224 may include any hardware and/or software necessary to carry out its functions.

In this example, security engine 224 includes in its core architecture, operating system notifications 540, configuration data 560, including rules, updaters, and other necessary configurations, inventory 570, and memory protection 580. These help provide for "launching" an executable object in block 530.

Executable object 530 may attempt to perform a file read or write operation, which in block 510 may be provisionally denied, for example if it is graylisted. Where appropriate, the user is asked for appropriate feedback.

In block 520, self-approval may be provided, such as based on cached user decisions. Self approval may also depend on a global reputation provided by a threat intelligence database 524. Threat intelligence 524 may be provided by any server 140, and may include an extensive database of executable objects provided by many devices across multiple platforms. In some cases, new executable objects may be examined and analyzed by human security experts, who may update threat intelligence 524 accordingly. In some cases, threat intelligence 524 may be context-sensitive. For example, a well-designed game may have a "high" or "good" reputation for home users, and thus may be whitelisted for home users. The same game may be against policy for an enterprise, and may thus have a "low" or "bad" reputation and be completely blacklisted. In yet another application, a parent may designate an entire class of games as being permitted only on approval, in which case the game may have an "intermediate" reputation and may be graylisted.

Self-approval 520 may interface with a file system and file system filter 550, which provides an interface to disk 250.

Furthermore in block 510, even where an executable object has a good global reputation, some or all files may be protected such that they can be read from or written to only by a process owned by the user or group who owns the file, or by system processes running with elevated privileges. Each file may have a class of "trusted," which are trusted only with respect to that file. This may include a list of users and groups, and of permissions for each. Those attributes may be inherited by child files and directories.

In block 530 the executable object attempt to execute, which may lead in block 512 to a provisional deny execution event if the executable object is graylisted. Again, the user may be asked as necessary, or in block 520, self-approval may be provided, such as based on cached user decisions.

Self-approval 520 provides users 120 with the option to take a preferred action when a deny write 510 or deny exec 520 occurs. Self approval in its turn uses several techniques to make intelligent decisions so as to minimize questions asked to user 120. Accordingly, self-approval may provide the following, by way of non-limiting example:

Ability to selectively activate the self approval feature via a token or for selected users across the enterprise. The activation may be time bound to accomplish a specific task on a specific system.

Minimal decision making from the user, as security implications of each decision are automated.

Ability to distinguish between types of actions, such as execute, write, package install, ActiveX component execution, and script execution, and allow the correct processes and executables to have relevant privileges. Some of those privileges may be inherited by subsequent child processes or cooperating processes. Inheritance may be managed by machine learning.

Automation of decision making via reputation (such as is derived from threat intelligence 524), previous decisions, enterprise-based decisions on the action, certificate reputation, and trusted enterprise tasks.

Ability to set persistent rules based on decisions.

Reduction in the number of questions asked of user 120 by automating many decision making processes. User decisions are cached to reduce the number of user decisions per task.

Support for multiple users and sessions on a single machine.

Ability to make certain decisions even when no user is present.

An audit trail for security administrator 150, including user decisions and automated decisions. Depending on these, enterprise global policies may be updated, wherein certain actions may be whitelisted across the enterprise, and other actions may be blacklisted across the enterprise.

Advantageously, this provides an ability to distinguish between, for example, prefetch access and actual executable object launch, allowing the correct process to execute with the correct privileges.

There is also provided determination of the intent of an operation using, for example, IRP flags to eliminate false positive questions, which can arise when a user right clicks on a file, such as in a file explorer session. This right click operation may be seen by the operating system as a potential write operation or an attempt to change file attributes, which may result in a spurious request for user input absent the system and methods of this Specification.

Figure 6:
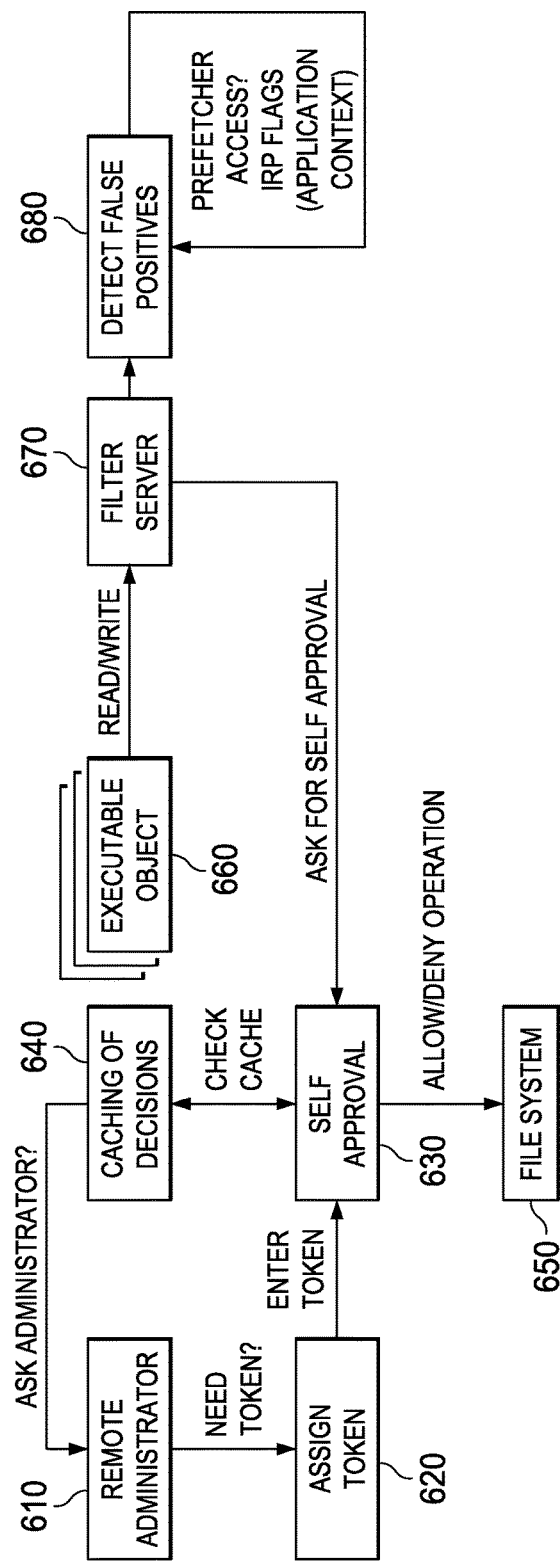
FIG. 6 is a functional block diagram of self-approval according to one or more examples of the present Specification.

FIG. 6 is a functional block diagram of self-approval according to one or more examples of the present Specification.

In block 660, an executable object performs a read, write, or other file operation.

In block 670, a filter server is provided. This driver looks, for example, at IRP flags and the application context so that in block 680, false positives can be detected and avoided. This may include, for example, determining whether this is a prefetch access, and examination of IRP flags. This enables security engine 224 to determine with some degree of confidence whether displaying a confirmation dialog will be spurious.

Actions that pass through block 670 may then seek self-approval in block 630. Block 630 may determine whether to allow or deny the operation. Certain portions of security engine 224 may integrate with a file system driver 650, so that file access and control may be managed at a detailed level.

In seeking self-approval, block 630 may consult cached decisions in block 640. If no cached decision is available, or according to an enterprise policy, in block 610 security administrator 150 may be consulted. In some cases, approval will require a token, which may be generated automatically or manually, and which may be shared via a self-approval popup for the user to ensure that the token is genuine. In block 620, security engine 224 assigns a token to the action, and provides the token to self-approval block 630. Ultimately, block 630 determines whether to allow or deny the operation.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the Specification, to limit this disclosure in any way that is not otherwise reflected in the appended claims.

EXAMPLE EMBODIMENTS

There is disclosed in example 1, a computing device comprising a storage containing an executable object; and a security engine operable for detecting that the executable object has attempted to perform an action; intercepting the action; assigning a reputation to the action; and acting on the reputation.

There is disclosed in example 2, the computing device of example 1, wherein acting on the reputation comprises permitting the executable object to perform the action.

There is disclosed in example 3, the computing device of example 1, wherein acting on the reputation comprises blocking the executable object from performing the action.

There is disclosed in example 4, the computing device of example 1, wherein acting on the reputation comprises providing a warning to a user.

There is disclosed in example 5, the computing device of example 1, wherein acting on the reputation comprises receiving a user decision related to the action.

There is disclosed in example 6, the computing device of example 5, wherein the reputation engine is further operable for caching the user decision.

There is disclosed in example 7, the computing device of example 1, wherein assigning a reputation to the action comprises using heuristics.

There is disclosed in example 8, the computing device of example 1, wherein assigning a reputation to the action comprises identifying the object's type; calculating a checksum for the object; and extracting object attributes.

There is disclosed in example 9, the computing device of example 1, wherein assigning a reputation to the action comprises consulting a threat intelligence database.

There is disclosed in example 10, the computing device of example 1, wherein assigning a reputation to the action comprises detecting an input/output request packet.

There is disclosed in example 11, the computing device of example 1, wherein assigning a reputation comprises providing a self-approval.

There is disclosed in example 12, the computing device of example 1, wherein acting on the reputation comprises detecting and avoiding false positives.

There is disclosed in example 13, the computing device of example 12, wherein detecting and avoiding false positives comprises determining that the executable object has been pre-fetched, and allowing pre-fetch actions without requesting a user decision.

There is disclosed in example 14, one or more computer-readable mediums having stored thereon executable instructions operable for instructing a processor for detecting that an executable object has attempted to perform an action; intercepting the action; assigning a reputation to the action; and acting on the reputation.

There is disclosed in example 15, the one or more computer-readable mediums of example 14, wherein acting on the reputation comprises permitting the executable object to perform the action.

There is disclosed in example 16, the one or more computer-readable mediums of example 14, wherein acting on the reputation comprises blocking the executable object from performing the action.

There is disclosed in example 17, the one or more computer-readable mediums of example 14, wherein acting on the reputation comprises providing a warning to a user.

There is disclosed in example 18, the one or more computer-readable mediums of example 14, wherein acting on the reputation comprises receiving a user decision related to the action.

There is disclosed in example 19, the one or more computer-readable mediums of example 18, wherein the instructions are further operable for instructing the processor for caching the user decision.

There is disclosed in example 20, the one or more computer-readable mediums of example 141, wherein assigning a reputation to the action comprises identifying the object's type; calculating a checksum for the object; and extracting object attributes.

There is disclosed in example 21, the one or more computer-readable mediums of example 14, wherein assigning a reputation to the action comprises detecting an input/output request packet.

There is disclosed in example 22, the one or more computer-readable mediums of example 14, wherein acting on the reputation comprises detecting and avoiding false positives.

There is disclosed in example 23, the one or more computer-readable mediums of example 22, wherein detecting and avoiding false positives comprises determining that the executable object has been pre-fetched, and allowing pre-fetch actions without requesting a user decision.

There is disclosed in example 24, a method comprising detecting that an executable object has attempted to perform an action; intercepting the action; assigning a reputation to the action; and acting on the reputation.

There is disclosed in example 25, the method of example 24, wherein acting on the reputation comprises detecting and avoiding false positives.

There is disclosed in example 26, a method comprising detecting that an executable object has attempted to perform an action; intercepting the action; assigning a reputation to the action; and acting on the reputation.

There is disclosed in example 27, the method of example 26, wherein acting on the reputation comprises permitting the executable object to perform the action.

There is disclosed in example 28, the method of example 26, wherein acting on the reputation comprises blocking the executable object from performing the action.

There is disclosed in example 29, the method of example 26, wherein acting on the reputation comprises providing a warning to a user.

There is disclosed in example 30, the method of example 26, wherein acting on the reputation comprises receiving a user decision related to the action.

There is disclosed in example 31, the method of example 30, further comprising instructing the processor for caching the user decision.

There is disclosed in example 32, the method of example 26, wherein assigning a reputation to the action comprises identifying the object's type; calculating a checksum for the object; and extracting object attributes.

There is disclosed in example 33, the method of example 26, wherein assigning a reputation to the action comprises detecting an input/output request packet.

There is disclosed in example 34, the method of example 26, wherein acting on the reputation comprises detecting and avoiding false positives.

There is disclosed in example 35, the method of example 34, wherein detecting and avoiding false positives comprises determining that the executable object has been pre-fetched, and allowing pre-fetch actions without requesting a user decision.

There is disclosed in example 36, an apparatus comprising means for performing any of the foregoing methods.

There is disclosed in example 37, the apparatus of method 36, wherein the means comprise a processor or memory.

There is disclosed in example 38, one or more computer-readable mediums having stored thereon executable instructions operable for instructing a processor to perform any of the foregoing methods.

What is claimed is:

1. A computing device comprising:
   a storage containing a graylist executable object; and
   one or more logic elements comprising a security engine operable for:
      detecting that the executable object has attempted to perform an action;
      intercepting the action;
      querying a confidence score cache for a cached confidence score for a combination of the executable object and the action;
      assigning a present confidence score to the action, the present confidence score for a combination of the executable object and the action, and accounting for the cached confidence score;
      acting on the present confidence score, comprising operating a machine learning algorithm configured to compare the present confidence score to confidence scores of one or more other objects previously authorized by a user, determining that the present confidence score equals or exceeds the confidence scores of the one or more other objects, and authorizing the action without asking for user verification; and
      caching the present confidence score to the confidence score cache.

2. The computing device of claim 1, wherein the security engine is further operable for determining that the present confidence score is below a threshold and blocking the action.

3. The computing device of claim 1, wherein acting on the present confidence score comprises providing a warning to a user.

4. The computing device of claim 1, wherein acting on the present confidence score comprises receiving a user decision related to the action.

5. The computing device of claim 4, wherein the security engine is further operable for caching the user decision.

6. The computing device of claim 1, wherein assigning a present confidence score to the action comprises using heuristics.

7. The computing device of claim 1, wherein assigning a present confidence score to the action comprises:
   identifying the executable object's type;
   calculating a checksum for the object; and
   extracting object attributes.

8. The computing device of claim 1, wherein assigning a present confidence score to the action comprises consulting a threat intelligence database.

9. The computing device of claim 1, wherein assigning a present confidence score to the action comprises detecting an input/output request packet.

10. The computing device of claim 1, wherein assigning a present confidence score comprises providing a self-approval.

11. The computing device of claim 1, wherein acting on the present confidence score comprises detecting and avoiding false positives.

12. The computing device of claim 11, wherein detecting and avoiding false positives comprises determining that the executable object has been pre-fetched, and allowing pre-fetch actions without requesting a user decision.

13. One or more non-transitory computer-readable mediums having stored thereon executable instructions operable for instructing a processor for:
   detecting that a graylist executable object has attempted to perform an action;
   intercepting the action;
   querying a confidence score cache for a cached confidence score for a combination of the executable object and the action;
   assigning a present confidence score to the action, the present confidence score for a combination of the executable object and the action, and accounting for the cached confidence score;
   acting on the present confidence score, comprising operating a machine learning algorithm configured to compare the present confidence score to confidence scores of one or more other objects previously authorized by a user, determining that the present confidence score equals or exceeds the confidence scores of the one or more other objects, and authorizing the action without asking for user verification; and
   caching the present confidence score to the confidence score cache.

14. The one or more non-transitory computer-readable mediums of claim 13, wherein the security engine is further operable for determining that the present confidence score is below a threshold and blocking the action.

15. The one or more non-transitory computer-readable mediums of claim 13, wherein acting on the present confidence score comprises providing a warning to a user.

16. The one or more non-transitory computer-readable mediums of claim 13, wherein acting on the present confidence score comprises receiving a user decision related to the action.

17. The one or more non-transitory computer-readable mediums of claim 16, wherein the instructions are further operable for instructing the processor for caching the user decision.

18. The one or more computer-readable mediums of claim 13, wherein assigning a present confidence score to the action comprises:
   identifying the executable object's type;
   calculating a checksum for the object; and
   extracting object attributes.

19. The one or more computer-readable mediums of claim 13, wherein assigning a present confidence score to the action comprises detecting an input/output request packet.

20. The one or more computer-readable mediums of claim 13, wherein acting on the present confidence score comprises detecting and avoiding false positives.

21. The one or more computer-readable mediums of claim 20, wherein detecting and avoiding false positives comprises determining that the executable object has been pre-fetched, and allowing pre-fetch actions without requesting a user decision.

22. A method comprising:
   detecting that a graylist executable object has attempted to perform an action;
   intercepting the action;
   querying a confidence score cache for a cached confidence score for a combination of the executable object and the action;
   assigning a present confidence score to the action, the present confidence score for a combination of the executable object and the action, and accounting for the cached confidence score;
   acting on the present confidence score, comprising operating a machine learning algorithm configured to compare the present confidence score to confidence scores of one or more other objects previously authorized by a user, determining that the present confidence score equals or exceeds the confidence scores of the one or more other objects, and authorizing the action without asking for user verification; and
   caching the present confidence score to the confidence score cache.

23. The method of claim 22, wherein acting on the present confidence score comprises detecting and avoiding false positives.

* * * * *

UNITED STATES PATENT AND TRADEMARK OFFICE
CERTIFICATE OF CORRECTION

| | |
|---|---|
| PATENT NO. | : 10,050,993 B2 |
| APPLICATION NO. | : 14/495692 |
| DATED | : August 14, 2018 |
| INVENTOR(S) | : Amritanshu Johri et al. |

It is certified that error appears in the above-identified patent and that said Letters Patent is hereby corrected as shown below:

In the Drawings

On sheet 5 of 6, in Figure 5, Line 11, delete "REPURATION" and insert -- REPUTATION --, therefor.

Signed and Sealed this
Thirtieth Day of October, 2018

Andrei Iancu
*Director of the United States Patent and Trademark Office*